March 22, 1949. H. A. GOLLMAR 2,464,805
GAS PURIFICATION PROCESS
Filed Feb. 20, 1945
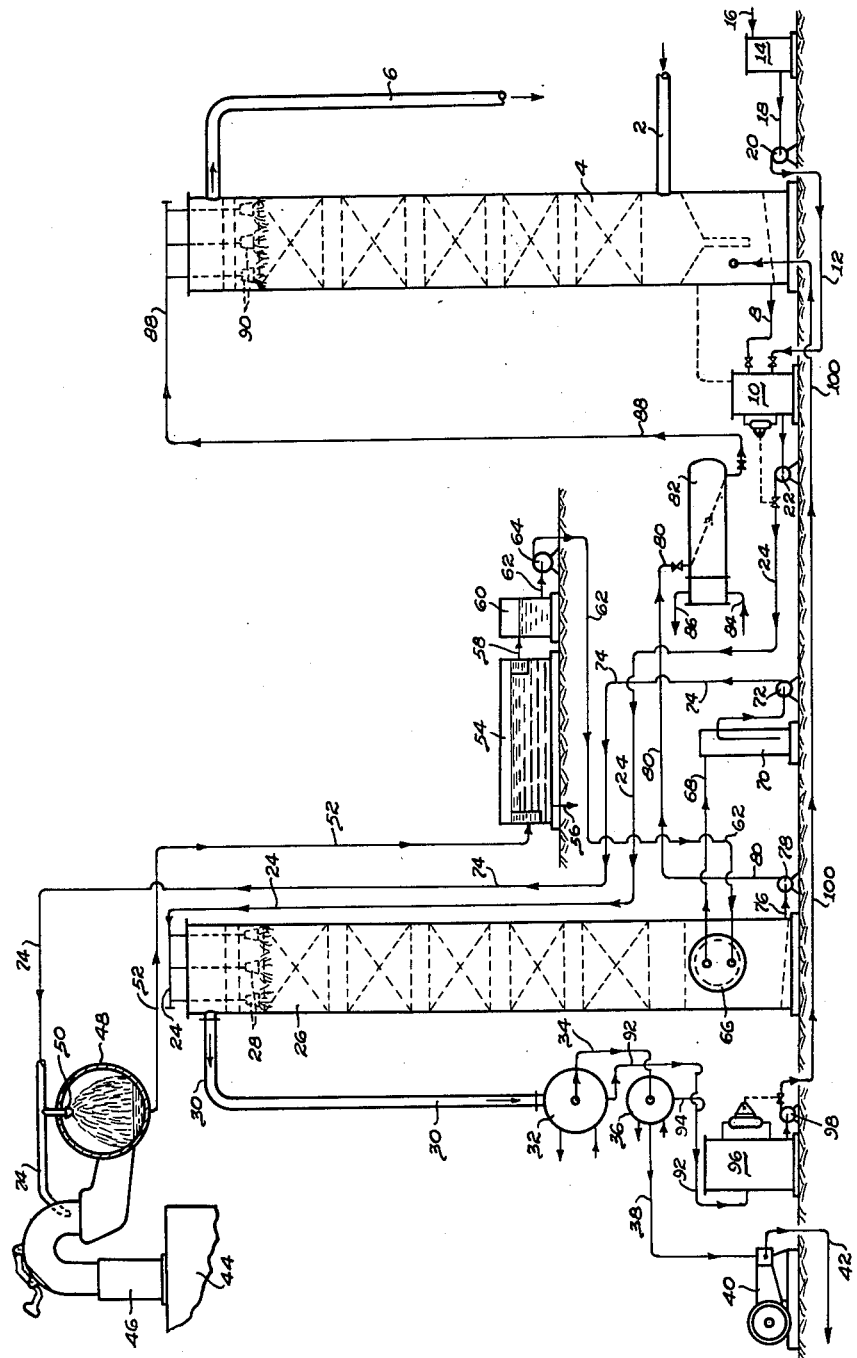
INVENTOR.
HERBERT A. GOLLMAR.
BY Edmund G Borden
his ATTORNEY.

Patented Mar. 22, 1949

2,464,805

UNITED STATES PATENT OFFICE 2,464,805

GAS PURIFICATION PROCESS

Herbert A. Gollmar, Mount Lebanon, Pa., assignor to Koppers Company, Inc., Pittsburgh, Pa., a corporation of Delaware Application February 20, 1945, Serial No. 578,861

3 Claims. (Cl. 23—3)

The present invention relates to the liquid purification of coke-oven gas and has particular reference to the utilization of the heat of fluids effluent to the collecting mains of a coke-oven battery in effecting such purification. The inventor's U. S. Patent No. 2,379,076 relates to the utilization of the heat of gaseous fluids from the collecting mains; the present invention refers to the utilization of the heat of liquids from the collecting mains.

An effective process for the purification of coke-oven gas in respect of its hydrogen sulphide content and for the recovery of the hydrogen sulphide comprehends scrubbing the gas with an alkaline aqueous solution; absorbing therein hydrogen sulphide; thereafter activating the alkaline solution for further absorption use by heating it under less than atmospheric pressure and thereby boiling and sweeping out hydrogen sulphide; and condensing moisture from the recovered hydrogen sulphide. Similar processes comprise removal of hydrogen cyanide, ammonia, light oil, or other compounds from coke-oven gas with a liquid absorbent and subsequent reactification of the absorbent under vacuum.

A primary object of the present invention is the provision of a more economical process of the type outlined above for liquid purification of coke-oven gas or of other fluid product of a coke-oven such as light oil, and the recovery of hydrogen sulphide or other constituent therefrom.

Another object of the invention is to provide a process of liquid purification which is more closely articulated with the byproduct system of a coke plant in order that overall advantages of economical operation can be obtained.

The invention has for further objects such other improvements and such other operative advantages or results as may be found to obtain in the processes or apparatus hereinafter described and claimed.

The present improvement contemplates utilizing for such vacuum-actification, as is above-described, the low-temperature heat that is present in the fluid, both liquidous and gaseous, effluent of the collecting mains of a coke-oven battery. The heat in these fluids is at such low thermal head that ordinarily it has been wasted since it has not been thought to be at a sufficiently high temperature level for byproduct processes requiring heat. It has been the custom heretofore to employ special cooling means to cool the fluids to desired temperature. The gas purification process of instant reference is particularly well adapted to the present improvement since the described waste heats can be used effectively under the vacuum in the actification zone even though the heats are of such low thermal head. In addition, the removal of heat from the said fluids for actification purposes at the same time effects the desired cooling of the effluent fluid.

As a specific improvement also within the teaching of the present invention, the utilization of heat from coke-oven gas is described and claimed in copending application Serial No. 545,468, filed July 18, 1944, now Patent No. 2,379,076.

In the accompanying drawing forming a part of this specification and illustrating for purposes of exemplification a preferred apparatus and method in which the invention is embodied and practiced but without limiting the claimed invention specifically to such illustrative instance or instances; the single figure is a diagrammatic elevational view of apparatus for the liquid purification of gas utilizing the heat of coke-plant flushing liquor.

Referring to the figure, coke-oven gas containing hydrogen sulphide flows through a pipe 2 into an absorber 4 containing packing and in which the said gas rises in countercurrent contact with continuously descending absorbent, for example, an alkaline aqueous solution containing sodium carbonate and sodium acid carbonate.

The said sodium carbonate solution in the absorber 4 absorbs hydrogen sulphide from the countercurrently flowing coke-oven gas. The so-treated coke-oven gas leaves the absorber at the top thereof and flows to additional apparatus of the byproduct system through the pipe 6. Fouled absorbent solution flows from the bottom of the absorber 4 through a valved pipe 8 into a pumping tank 10 to which also is delivered through a valved pipe 12 freshly made up absorbent. The said made up absorbent is prepared in a mixing tank 14 into which is delivered water and, for example, sodium carbonate through a pipe 16, for mixing therein. The fresh absorbent is pumped from the mixing tank 14 through a pipe 18 by pump 20 and through the said pipe 12 to the hereinbefore mentioned pumping tank 10. Fouled absorbent from the pumping tank 10 is delivered by a pump 22 through a pipe 24 into the top of an actifier column 26 and is distributed through nozzles 28 in a descending flow down over packing in the column. In the actifier 26 the fouled absorbent is brought into direct contact with rising, countercurrently flowing gases and vapors which continuously liberate dissolved hydrogen sulphide from the fouled absorbent, and which thereby actify the downflowing absorbent.

The relatively cool fouled absorbent flowing into the top of the actifier 26 also acts as a condensing medium partially to condense steam from the said vapors which are produced in and rise through the actifying column.

The hydrogen sulphide and remaining steam in admixture therewith are flowed from the top of the actifier 26 through a pipe 30 into a condenser 32 wherein a larger portion of the remaining steam is condensed. Thence the hydrogen sulphide flows through a pipe 34 to a second condenser 36, of smaller dimension, in which substantially the remainder of the steam is condensed. Substantially dry technical grade hydrogen sulphide is continuously withdrawn from the said condenser 36 through pipe 38 by the vacuum pump 40 by which means the entire actification zone is held under less than atmospheric pressure and by which means also the hydrogen sulphide is pumped through a pipe 42 to any point for utilization thereof. Hydrogen cyanide, which is also recovered from the gas by the described process can be separated from the hydrogen sulphide by any of several known processes whereby both substantially pure hydrogen sulphide and hydrogen cyanide can be obtained.

Coke-oven gas flowing from a coke-oven battery 44 into one standpipe 46 of many and thence into a collecting main 48 is cooled therein by a spray of flushing liquor from nozzle 50. The flushing liquor having been heated by the hot gas in the collecting main 48 flows through a pipe 52 to a hot settling tank 54 in which tar which has been condensed therewith is settled out and from which the tar is drained through a pipe 56. Flushing liquor is decanted from the hot settling tank 54 through a pipe 58 into hot flushing liquor pumping tank 60. The flushing liquor is pumped from the tank 60 through pipe 62 by a pump 64, disposed therein, and into coils in a reboiler 66 located in the base of actifier tower 26.

The coils of the reboiler 66 are immersed in absorbent solution which collects in the said base of the actifier column. The heat of the flushing liquor in the coils boils the solution in which they are immersed and drives steam and hydrogen sulphide in an ascending vaporous stream into countercurrent contact with descending fouled absorbent solution. Absorbent solution in the base of the actifier 26 has, therefore and by the above described step, been actified.

Cooled flushing liquor is flowed from the reboiler 66 through a pipe 68 into a pumping tank 70, whence it is pumped by a pump 72 in return to the collecting main 48 through a pipe 74.

The flushing liquor so delivered to the collecting mains is thus cooler than in customary operation; and as a result thereof a thinner tar is condensed in the mains, making the cleaning of them easier, and the gas is cooled to a greater degree than that obtained by customary operation thereby relieving the load on the primary gas-coolers of a byproduct plant.

Actified absorbent is withdrawn from the bottom of the said actifier 26 through a pipe 76 and is pumped by pump 78 through a pipe 80 to a cooler 82 that is conventionally supplied with inlet and outlet cooling-water pipes 84 and 86, respectively. Cooled, actified absorbent is flowed from the said cooler 82 through a valved pipe 88 to the top of the absorber 4 into which it is sprayed by nozzles 90 upon the packing provided therein.

Condensed steam is flowed from the said condensers 32 and 36 through pipes 92 and 94 respectively into a pumping tank 96. Collected condensate is withdrawn by a pump 98 from the said tank 96 through a pipe 100 and is pumped into the bottom of the absorber 4 at which point the condensate is mixed with fouled absorbent in order that it may simultaneously be actified and treated for removal of any hydrogen sulphide dissolved therein.

In one instance of customary modern practice employing liquor flushing in the collecting mains, flushing liquor was sprayed into the mains at an average temperature of about 77° C. and was drained therefrom at a temperature of 78° C. In other instances flushing-liquor temperatures are as high as 85° C., and therefore would furnish even greater heat capacity for the present improvement. In an example of operation employing the process of the present invention, the flushing liquor which formerly exhibited the said inlet and outlet temperatures of 77° and 78° C. respectively is so-cooled by the heat exchange effected in the vacuum actification zone that a new temperature of about 66° C. in the flushing liquor entering the collecting main 48 and an outlet temperature of 72° C. is provided. Thus, the described advantages of facilitating the cleaning of the collecting mains and of reducing the load on the primary coolers are obtained. In respect of the latter advantage an additional cooling of the coke-oven gas of 3° to 5° C. is effected whereby the amount of water carried by the saturated gas is reduced and its sensible heat is lowered consequently reducing to a substantial degree the amount of cooling water required in the final coolers.

In an actifier operating under 3.9 to 4.5 inches mercury absolute pressure and heated by the above described flushing liquor entering the reboiler at approximately 72° C. and leaving at 66° C., absorbent solution is actified and is heated from an inlet temperature of 51° C. to an outlet temperature of the actified solution of 55° C. The actified solution is cooled before being returned to the absorber and is there heated to approximately the temperature of the inlet gas, which is about 52° C.

Hydrogen sulphide and vapors therewith, liberated in the actifier, leave the same at a temperature of about 53° C. and an absolute pressure of 3.9 inches mercury. It is cooled in the first condenser 32 to 38° C. and in the second condenser 36 to 25° C. at 3.0 inches mercury. The hydrogen sulphide substantially separated from its accompanying moisture is delivered through the pipe 42 by the pump 40 at approximately 25° C. and 33 inches of mercury absolute. In such an example, 12,000 gallons per hour of foul solution are actified by a vapor rate (of vapor boiled off the actified solution by the heat of the flushing liquor in the reboiler) of 1,830,000 cubic feet per hour, and 18,200,000 cubic feet of gas is treated for removal of 7200 pounds of hydrogen sulphide per day.

In the above given example, 8,300,000 B. t. u. are required for vacuum actification. Heretofore, the industry has not considered the heat of fluids effluent of the collecting mains utilizable because of their low thermal head which is such that only small portions of their heat would ordinarily be transferable. With the present invention the heat supply has been found to be adequate from this source. With a liquor flushing rate of 105,000 gallons per hour as in the above example a cooling of the flushing liquor in the actification zone of only 5° C. will furnish sufficient heat for the purification of all of the coke-oven gas by the above process.

In certain instances it may be preferred to heat actified solution, under mild pressure, by indirect contact with flushing liquor, and then conduct the heated solution to the vacuum actification zone wherein heated solution vaporizes, passes through the fouled solution, and actifies the same. In such method, the flow-rate of actified solution through the heat exchanger is several times the rate of withdrawal of actified solution being returned to the absorber, in order that sufficient vapors are provided to ensure adequate actification.

In other instances the flushing liquor can itself be vaporized by flowing it into a zone of low pressure. The so-formed water vapors can thereafter be passed countercurrently through the fouled absorbent to liberate absorbed constituent therefrom. Whether flushing liquor, or other effluent, is employed directly or indirectly its heat is utilized to form water vapor from itself or the absorbent, which will sweep absorbed constituent from the fouled absorbent.

The herein described invention can be employed to improve the efficiency of any process for liquid purification wherein the fouled liquid absorbent containing a constituent which has been scrubbed from a gas or extracted from a liquid is actifiable under subatmospheric pressure by heating the same. An example of a liquid purification process similar to the one herewith described comprises the use of water to absorb ammonia and hydrogen cyanide from raw coke-oven gas, the water containing the absorbed gases being thereafter actifiable by heating at subatmospheric pressure. Aqueous absorbents can be, for example, water or aqueous solutions of potassium, sodium, or other alkali metal carbonates and bicarbonates, solutions of alkali-metal salts of other weak acids, or solutions of weak bases such as organic amines. The absorbable constituent in coke-oven gas, or coal gas, can be hydrogen sulphide, hydrogen cyanide, carbon dioxide, ammonia, light oil, or carbon disulphide. The light oil and carbon disulphide can be recovered by scrubbing coke-oven gas with a straw oil and the light oil be stripped therefrom, under vacuum, by heat from the said effluent fluids. Such light oil for example can be purified in respect of removal of its hydrogen sulphide content by extraction of it with an alkaline aqueous solution which can thereafter be regenerated under vacuum by the low-temperature heat recoverable from the described effluent fluids.

The invention as hereinabove set forth is embodied in particular form and manner but may be variously embodied within the scope of the claims hereinafter made.

I claim:

1. A process for separation and recovery of hydrogen sulphide, and the like, from coke-oven gas, comprising: scrubbing the coke-oven gas with an alkaline aqueous absorbent and absorbing hydrogen sulphide therefrom; removing fouled absorbent containing the dissolved hydrogen sulphide from the absorption zone and flowing the same through an actification zone under less than atmospheric pressure; liberating hydrogen sulphide from the said absorbent in the actification zone by application thereto of the heat, at relatively low thermal head, of flushing liquor effluent of a collecting main of the coke-oven battery; circulating so-cooled flushing liquor in a closed cycle between the actification zone and the collecting main and removing liberated hydrogen sulphide from the actification zone.

2. A process for separating and recovering hydrogen sulphide and the like from coke-oven gas, comprising: scrubbing the gas with an alkaline aqueous absorbent and absorbing hydrogen sulphide therefrom; removing fouled absorbent containing the dissolved hydrogen sulphide from the absorption zone and flowing the same through an actification zone under less than atmospheric pressure; circulating actified solution from the actification zone into indirect contact with hot flushing liquor effluent of a collecting main of a coke-oven battery and by heat interchange therewith heating the actified solution; expanding the heated solution into the actification zone to generate vapors which pass into direct contact with fouled absorbent and liberate therefrom gases including hydrogen sulphide; removing hydrogen sulphide from the actification zone; circulating so-cooled flushing liquor in a closed cycle between the actification zone and the collecting main and returning actified solution, in closed cycle, to the absorption zone.

3. In a continuous process for the separation and recovery of hydrogen sulphide from coke-oven gas, in which process coke-oven gas is scrubbed with an aqueous solution of alkali-metal carbonate and hydrogen sulphide is absorbed thereby and dissolved in solution, and in which the fouled absorbent is thereafter actified by heating at less than atmospheric pressure, the improvement comprising: continuously flowing absorbent into indirect contact with coke-plant flushing liquor directly effluent to the collecting main of the coke-oven battery and raising the temperature of the absorbent above 50° C. and effecting a proportionate cooling of the flushing liquor; recirculating, in a closed cycle, the so-cooled flushing liquor to the collecting main and effecting a lowering of the operating temperature of the collecting mains of about 5° C.; and continuously passing the vapors of the said heated absorbent at less than atmospheric pressure into countercurrent and direct contact with fouled absorbent and liberating hydrogen sulphide from the fouled absorbent.

HERBERT A. GOLLMAR.

REFERENCES CITED

The following references are of record in the file of this patent:

UNITED STATES PATENTS

| Number | Name | Date |
|---|---|---|
| 1,733,321 | Sperr | Oct. 29, 1929 |
| 2,242,323 | Powell | May 20, 1941 |
| 2,368,600 | Rosenstein | Jan. 30, 1945 |
| 2,379,076 | Gollmar | June 26, 1945 |